United States Patent
Kocksch et al.

(10) Patent No.: US 8,801,927 B2
(45) Date of Patent: Aug. 12, 2014

(54) FILTER SYSTEM FOR FILTERING FLUIDS

(75) Inventors: Christian Kocksch, Römerberg (DE);
Thomas Rodewaldt, Herrnburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 932 days.

(21) Appl. No.: 12/898,402

(22) Filed: Oct. 5, 2010

(65) Prior Publication Data
US 2011/0100893 A1    May 5, 2011

(30) Foreign Application Priority Data
Oct. 6, 2009  (DE) .................. 10 2009 048 412

(51) Int. Cl.
*B01D 27/08*  (2006.01)
*B01D 35/30*  (2006.01)

(52) U.S. Cl.
USPC ............. 210/232; 210/443; 210/444

(58) Field of Classification Search
USPC .......................... 210/232, 444, 443
See application file for complete search history.

(56) References Cited

U.S. PATENT DOCUMENTS

| 6,006,924 A | 12/1999 | Sandford |
| 2006/0180539 A1* | 8/2006 | Wolf et al. ............ 210/232 |
| 2007/0039864 A1* | 2/2007 | Dworatzek et al. ...... 210/235 |

FOREIGN PATENT DOCUMENTS

| EP | 0880987 | 12/1998 |
| WO | WO03082434 | 10/2003 |

OTHER PUBLICATIONS

German Patent Office search report of DE 10 2009 048 412.4, Mar. 25, 2010.

* cited by examiner

*Primary Examiner* — Thomas M Lithgow
(74) *Attorney, Agent, or Firm* — James Hasselbeck

(57) ABSTRACT

A filter system for filtering fluids has a housing, an inlet, and an outlet. A filter element is arranged inside the housing. A cover closes the housing and provides access to the filter element inside the housing. A securing device prevents the housing from being closed by the cover when the filter element is missing. The filter element has at least one filter element guide path section. The housing or the cover has a rim area with at least one rim guide path section. The filter element guide path section and the rim guide path section supplement one another to a guide path. The securing device comprises at least one securing element arranged on the cover or the housing. The securing element is guided on the guide path when a closing movement is carried out for closing the housing by the cover.

13 Claims, 7 Drawing Sheets

FILTER SYSTEM FOR FILTERING FLUIDS

CROSS REFERENCE TO RELATED APPLICATIONS

This application claims the benefit under 35 USC 119 of foreign application 10 2009 048 412.4 filed in Germany on Oct. 6, 2009, and which is hereby incorporated by reference in its entirety.

BACKGROUND OF THE INVENTION

The invention concerns a filter system for filtering fluids (gases, liquids), especially fluids used in a motor vehicle. The filter system comprises a housing as well as an inlet and an outlet, a filter element arranged in the housing preferably in coaxial arrangement, a cover closing the housing and providing access to the filter element, and a securing device that prevents closing of the housing by means of the cover should the filter element be missing, be of the wrong kind or mounted in the wrong way.

Moreover, the invention concerns a filter element, preferably in coaxial form or arrangement, of a filter system for filtering fluids, especially fluids used in a motor vehicle, wherein the filter system comprises a housing in which the filter element can be arranged, an inlet and an outlet, a cover closing the housing and providing access to the filter element, and a securing device that prevents closing of the housing by means of the cover should the filter element be missing, be of the wrong kind or be mounted in the wrong way.

Such filter systems or filter elements are used for filtering gaseous or liquid fluids. In motor vehicles and industrial engines such filter systems are used for filtering especially combustion air or compressed air, fuel, especially diesel fuel or gasoline, motor oil or hydraulic oil.

EP 0 934 108 B1 discloses a filter system with a housing in which a filter element is arranged. The housing can be closed by means of a cover that also provides access to the filter element. For preventing that the cover closes the housing when the filter element is missing, a securing element is provided. The securing element is disposed and rotatably supported on the housing of the filter. When the filter element is inserted, a lever arm of the securing element rests against the filter element and thus positions a blocking element of the securing element into a position that enables placement of the cover onto the housing. When the filter element is missing, the securing element is moved, as a result of gravity and greater mass of the blocking element of the securing element, into a position that prevents placement of the cover onto the housing.

The invention has the object to design a filter system and a filter element of the aforementioned kind in such a way that with simple and reliable means the closure of the housing is prevented when the filter element is missing or the wrong type of filter element is used or the filter element is mounted in the wrong way.

SUMMARY OF THE INVENTION

In accordance with the present invention, this is achieved in that the filter element has at least one filter element guide path section and the rim area of the housing or of the cover has at least one rim guide path section and the filter element guide path section and the rim guide path section complement one another to form a guide path along which at least one securing element provided on the cover or the housing is guided when a closing movement to close the housing is carried out.

According to the present invention, on the filter element and on the cover or on the housing, i.e., on the cover or the housing or an element belonging to the cover or the housing, guide path sections are provided that according to the key-and-lock principle supplement one another to a guide path for the securing element. When the rim guide path section is arranged on the cover, the securing element is disposed on the housing, and vice versa, so that the securing element when performing a closing movement can be guided along the rim guide path section and the filter element guide path section. When the filter element guide path section is not mounted or a filter element guide path section is mounted that is too small, gaps remain in the circumferential direction before or behind the rim guide path section and the securing element when carrying out the closing movement will lock in such a gap and hit blocking sections of the rim guide path section. In this way, not only when the filter element is missing but also any time the rim guide path section is not supplemented correctly by the matching filter element guide path section, the closure of the housing is prevented. In this way, especially damage caused by inadequate filtration is prevented. The securing device can be used easily also in filter systems of conventional configuration in which the cover is a filter head and the housing is a filter cup. Alternatively, gaps produced by different diameters of the guide path sections of filter element end disk and filter cup can also prevent screwing in the filter cup.

In an advantageous embodiment, the end face of the filter element that is facing the rim area of the housing or of the cover can be provided with a connecting end disk that supports the filter element guide path section. Such connecting end disks are commonly used in known round filter elements in order to provide the required support for a filter medium, particularly a nonwoven filter medium. The connecting end disk can be furnished simply with the filter element guide path section so that an additional component is not required.

Advantageously, the housing can be connected detachably to the cover by a rotary/plug-in (insertion) movement. The filter housing and the filter element can thus be pushed in a simple way in axial direction onto the cover and subsequently by a rotary movement, in particular in the manner of a screw or bayonet connection, can be secured thereon.

The securing element advantageously can be an elastic spring element. Spring elements can be produced and mounted in a simple way and are less sensitive with regard to soiling than rotatably supported securing elements known in the prior art. The spring element can be advantageously comprised of plastic or metal.

In a further advantageous embodiment the at least one securing element can be attached to the cover. The rim guide path section can be arranged advantageously on the housing. For mounting, the filter element can thus first be introduced into the housing wherein the filter element guide path section and the rim guide path section supplement one another to the guide path. Subsequently, the housing with the filter element can be connected to the cover wherein the securing element arranged on the cover is guided along the guide path.

Alternatively, the at least one securing element can be attached advantageously to a separating or partitioning element that may extend between the cover and the housing. The separating or partitioning element can be connected in particular to the cover. The partitioning element, in particular a partitioning disk, can be manufactured simply as a separate component with the at least one securing element. In this way, it is also possible to retrofit already existing covers, in particular filter heads, with the securing element.

In a further advantageous embodiment, the rim guide path section can be designed asymmetrically in such a way that for a filter element guide path section that is missing, of the wrong type or wrongly mounted the securing element, upon movement of the cover relative to the housing in the closing direction, will hit a blocking section of the rim guide path section and prevent closure of the housing and the securing element when the cover is moved relative the housing in the opening direction is guided along a guide section of the rim guide path section for opening the housing. In this way, it is ensured that the cover can be simply removed from the housing should a wrong filter element be used or the filter element be mounted in the wrong way. Even when no filter element is installed, the cover can be released again.

In a further advantageous embodiment, the housing and the filter element can be cylindrical; in particular, the filter element is a round filter element. In case of cylindrical filter elements and housings a beneficial ratio between active filter surface and thus filter efficiency and space requirements exists.

The object is furthermore solved in that the filter element has at least one filter element guide path section and the rim area of the housing or the cover has at least one rim guide path section and the filter element guide path section and the rim guide path section supplement one another to a guide path along which at least one securing element provided on the cover or the housing upon carrying out a closing movement is guided. The advantages of the filter system apply to the filter element as well.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
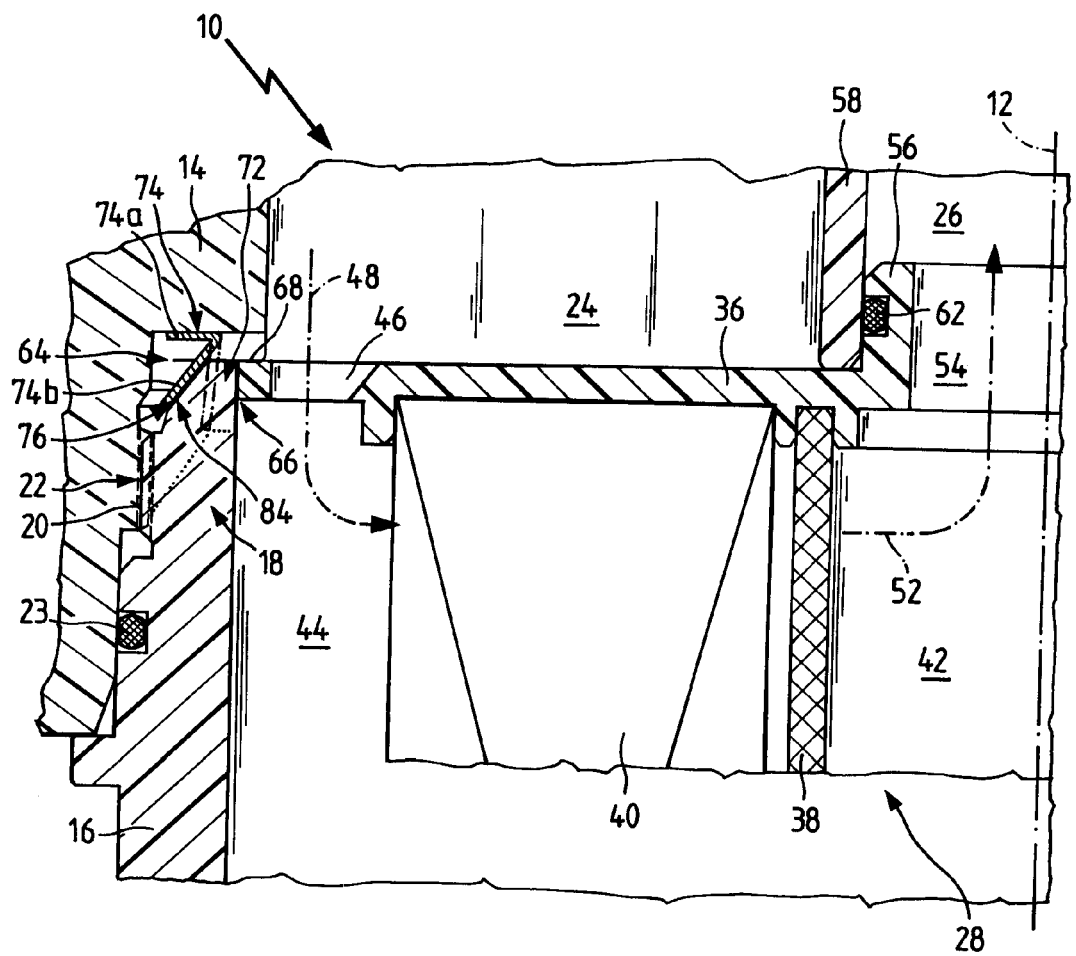
FIG. 1 shows schematically a detail view of a first embodiment of a filter system in longitudinal section in the area of a securing device that prevents closure of the filter cup with a filter head when the filter element is missing or is of the wrong type or is mounted in the wrong way.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter system for filtering fluids. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows in section view one half of a filter system 10 referenced as a whole by reference numeral 10 for filtration of liquid or gaseous fluids of a motor vehicle. The filter system 10, as a whole, is symmetrical to a symmetry axis illustrated in FIG. 1. When in the following the terms "radial", "axial" and "in circumferential direction" are used, this refers to the symmetry axis in the mounted state of the filter system. The same holds true for the individual components when not mounted.

The filter system 10 can be used, for example, for filtration of combustion air or compressed air, fuel, in particular diesel fuel or gasoline, motor oil or hydraulic oil.

The filter system 10 comprises a filter head 14 and a filter cup 16 of shape-stable material, for example, plastic material. The filter cup 16 that is open toward the filter head 14 has in its rim area 18 at the radial outer circumferential side an outer thread 20. The filter head 14 has a cup-shaped receiving area 22 that is open toward the filter cup 16 and is stepped and is provided with an inner thread matching the outer thread 20. The filter cup 16 is screwed in with its rim area 18 by means of a rotational plug-in (insertion) movement from below in a suspended position into the receiving area 22 of the filter head 14. The filter cup 16 is in this way detachably connected to the filter head 14 and functionally connected to an annular inlet space 24 for the fluid to be filtered and an outlet passage 26 for filtered fluid in the filter head 14.

In the radial outer circumferential side of the filter cup 16 there is moreover a sealing groove in which an O-ring seal 23 is located that seals the filter cup 16 relative to the filter head 14.

In the filter cup 16 an exchangeable round filter element 28 of the filter system 10 is inserted axially relative to the symmetry axis 12.

The round filter element 28 has in its end face that is facing the rim area 18 of the filter cup 16 a connecting end disk 36. At the end face that is facing away from the rim area 18 of the filter cup 16 and is not shown in FIG. 1, the round filter element 28 has a second end disk whose basic surface area extends parallel to the connecting end disk 36. A fluid-permeable support pipe 38 extends between the connecting end disk 36 and the second end disk. The connecting end disk 36, the second end disk, and the support pipe 38 are made from plastic material.

The support pipe 38 is surrounded by a filter medium 40 in the form of a filter bellows of zigzag-shaped folded nonwoven material. The support pipe 38 delimits an interior 42 of the filter medium 40 that forms the purified fluid side of the filter medium 40.

The filter medium 40 is surrounded by an annular inlet space 44 that forms the unfiltered fluid side of the filter medium 40. The annular inlet space 44 is connected by several through bores 46 provided in the connecting end disk 36 with the annular inlet space 24 of the filter head 14. The fluid to be filtered can flow from the annular inlet space 24 in the direction of arrow 48 into the annular inlet space 44. The through openings 46 are located uniformly distributed in an area between the filter medium 40 and a radial outer rim area 66 of the connecting end disk 36. This is shown in particular in FIG. 2. The filter medium 40 can be flowed through by the fluid to be filtered radially from the exterior to the interior, in the direction of arrows 48 and 52 as illustrated in FIG. 1, from the annular inlet space 44 to the interior 42.

The connecting end disk 36 has an end disk opening 54 that is concentric to the support pipe 38. A hollow-cylindrical connecting socket 56 surrounds the end disk opening 54 and extends at the base surface of the connecting end disk 36 facing away from the support pipe 38 in axial direction outwardly.

In the mounted position illustrated in FIG. 1, the connecting pin 56 is positioned in a receiving sleeve 58 of the filter head 14. In the radially outer circumferential side of the connecting socket 56 there is a circumferential sealing groove with an O-ring seal 62.

In the interior of the receiving sleeve 58 the outlet passage 26 for the filtered fluid extends in axial direction; the outlet passage 26 extends past the end of the filter head 14 of the filter system 10. The filtered fluid can flow from the interior 42 of the round filter element 28 through the end disk opening 54 and the interior of the connecting socket 56 into the outlet passage 26.

The securing device that is referenced as a whole by reference numeral 64 prevents closure of the filter cup 16 by means of the filter head 14 when the round filter element 28 is missing, is mounted in the wrong way, or is of the wrong type.

Figure 2:
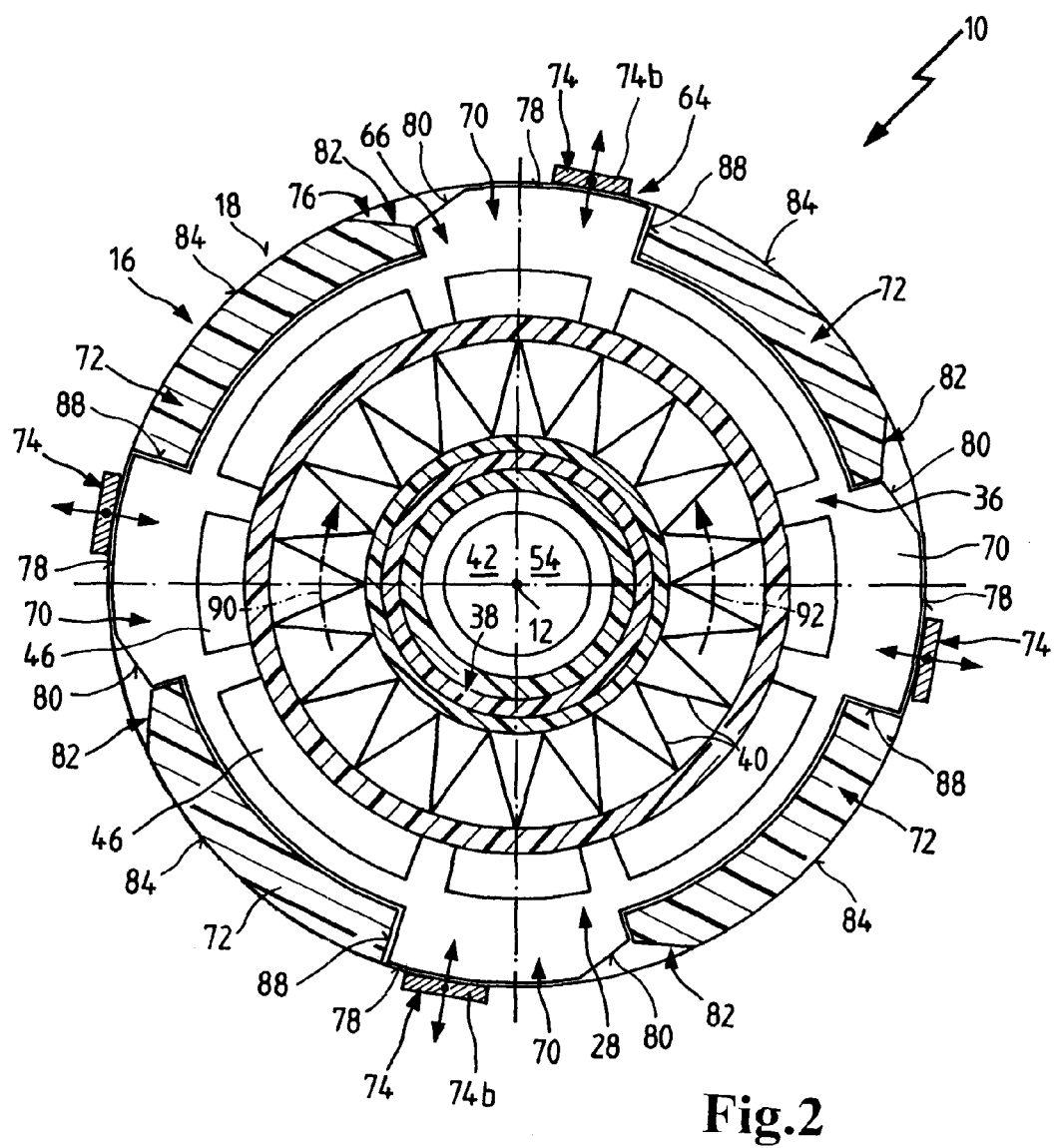
FIG. 2 shows schematically the filter system of FIG. 1 in the area of the securing device in cross-section.

In FIG. 2 the filter system 10 in the area of the securing device 64 is shown in cross-section in a viewing direction from the filter medium 40 onto the connecting end disk 36. The securing device 64 comprises four filter element guide path sections 70 that are arranged on the connecting end disk 36 of the filter element 28, four rim guide path sections 72 that are arranged in the rim area 18 of the filter cup 16, and four securing spring elements 74 that are attached in the receiving area 22 of the filter head 14. The filter element guide path sections 70 and the rim guide path sections 72 supplement one another to a guide path 76, as shown in FIG. 2, when the round filter element 28 is correctly mounted; the guide path 76 extends in circumferential direction and is positioned radially outwardly. The securing spring elements 74 are guided on the guide path 76 upon screwing in the filter cup 16 into the filter head 14 or upon unscrewing the filter cup 16 from the filter head 14.

The filter element guide path sections 70 are projections in the radial outer rim area 66 of the connecting end disk 36 that extend in radial and circumferential direction. They are uniformly distributed in circumferential direction of the connecting end disk 36. The outer surfaces in circumferential direction of the filter element guide path sections 70 extend in planes that contain the symmetry axis 12. However, they can also extend at a slant thereto. The guide path sections may also be formed to be non-uniform or to have different width. In this way, it is also possible to provide a suitable coding of the filter elements.

A radial outer guide surface 78 of the filter element guide path sections 70, respectively, is positioned on an outer envelope surface of an imaginary cone that is coaxial relative to the symmetry axis 12 and whose tip points away from the interior of the round filter element 28. In FIG. 2, only the rims of the guide surfaces 78 facing the filter medium 40 are shown. The securing spring elements 74 upon insertion of the filter cup 16 with the round filter element 28 can be guided into the receiving space 22 along the guide surface 78 in axial direction and are thus bent radially outwardly.

Each guide surface 78 is adjoined in the circumferential direction on one side of the filter element guide path section 70 by a radially inwardly slanted ramp surface 80. In FIG. 2, only the edges of the ramp surfaces 80 are shown that are facing the filter medium 40. The ramp surfaces 80 are part of the guide path 76 and serve for alignment with the outer contours of guide sections 82 of the neighboring rim guide path sections 72, respectively; these guide sections are explained infra.

Figure 3:
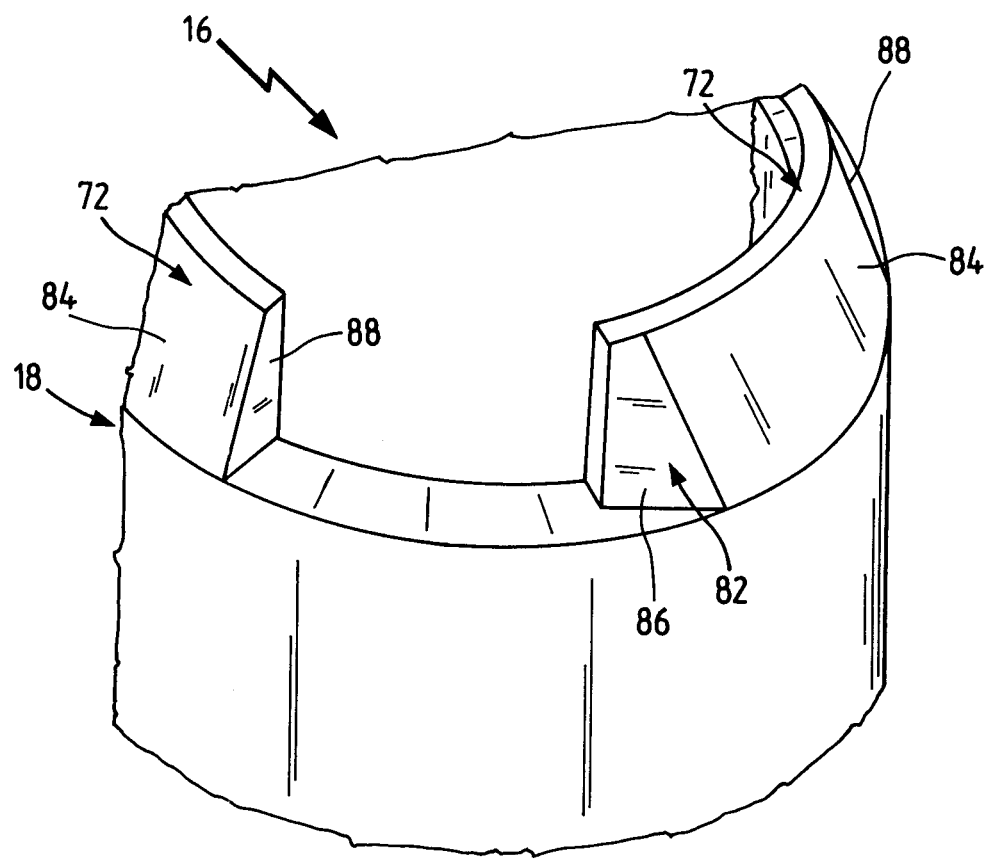
FIG. 3 shows schematically a detail of the rim area of the filter cup of FIG. 1 in isometric illustration.

The rim guide path sections 72, as shown in FIG. 3, are asymmetrically formed projections that in axial and circumferential direction extend within the rim area 18 of the filter cup 16. The four rim guide path sections 72 are uniformly distributed in circumferential direction. The outer surfaces of the rim guide path sections 72 in circumferential direction are positioned in the mounted state flat against the neighboring outer surfaces of the filter element guide path sections 70, respectively. They may also extend at a slant to them or be bent as long as the radial outer contours of the rim guide path sections 72 and the filter element guide path sections 70 pass into one another without gap. The extension of the rim guide path sections 72 in circumferential direction corresponds to the spacing of the filter element guide path sections 70 in circumferential direction so that they match the free areas between the filter element guide path section 70.

Radial outer rim guide surfaces 84 of the rim guide path sections 72 are slanted like the guide surfaces 78 of the filter element guide path sections 70 relative to the symmetry axis 12. When the round filter element 28 is in the mounted position, the rim guide surfaces 84 of the rim guide path sections 72 are resting on the outer envelope surface of the same imaginary cone as the guide surfaces 78 of the filter element guide path sections 70. When pushing in the round filter element 28, the securing spring elements 74 can thus also be guided on the rim guide surfaces 84 in axial direction and are thus bent radially outwardly. The filter cup 16 with the round filter element 28 can therefore be inserted in any rotary position relative to the symmetry axis 12 in axial direction into the receiving area 22 of the filter head 14.

When the filter element 28 is mounted, each one of the rim guide surfaces 84 is adjoined in circumferential direction on a side that is facing the ramp surface 80 of the neighboring filter element guide path section 70 by the respective guide section 82 of the rim guide path section 72. Each guide section 82 has at its radial outer side a guide surface 86 that, similar to the ramp surface 80, is radially inwardly slanted.

The sides of the rim guide path sections 72 that are positioned opposite the rim guide path sections 82 in the circumferential direction each form a blocking section 88. The blocking sections 88 serve as stops against which the securing spring elements 74 hit when the filter cup 16 is screwed into the filter head 14 without the round filter element 28 being in place. Of course, the spring elements can also hit the blocking sections 88 when a filter element of the wrong kind is mounted.

The receiving area 22 of the filter head 14 is limited in axial direction by an annular stop surface 68 that is coaxial to and extends circumferentially relative to the receiving area 22. Along the annular stop surface 68 the four securing spring elements 74 are circumferentially uniformly distributed. The securing spring elements 74 are spring plates that are almost rectangularly bent and each have a securing arm 74a and a spring arm 74b. The securing spring elements 74 are each secured with their securing arm 74a in the filter head 14. In this connection, the securing arm 74a is oriented radially relative to the symmetry axis 12 and its free end points outwardly. The spring arm 74b of the securing element 74 points in relaxed state, i.e., when the filter cup 16 is not mounted, in almost axial direction away from the annular stop surface 68. In FIG. 1 one of the spring arms 74b in the tensioned state with mounted filter cup 16 is shown cross-hatched. To the right adjacent thereto the spring arm 74b is shown without cross-hatching in the relaxed state when the filter cup 16 not mounted. The spring arms 74b of the securing spring element 74 are elastic in radial direction while in circumferential direction of the receiving area 22 of the filter head 154 they are rigid. The facing inner sides of the free ends of the spring arms 74b of the securing spring elements 74 in the relaxed state are positioned on a circle that is coaxial to the symmetry axis 12. The radius of the circle is at least as large as the radius of the circle on which the edges of the guide surfaces 76 of the filter element guide path sections 70 and the rim guide surfaces 84 of the rim guide path sections 72 are positioned which edges are facing away from the filter medium. In this way, the spring arms 74b can engage radially externally the rim of the guide path 76 upon insertion of the filter cup 16 with the round filter element 28 into the receiving area 22 of the filter head 14.

For exchanging the round filter element 28, first the filter cup 16 is unscrewed from the receiving area 22 of the filter head 14, in FIG. 2 in the direction of arrow 90, and is pulled out downwardly parallel to the symmetry axis 12 in the suspended arrangement illustrated in FIG. 1. When doing so, the spring arms 74b glide under mechanical tension along the guide path 76. Subsequently, the round filter element 28 is pulled parallel to the symmetry axis 12 out of the now open filter cup 16.

The new round filter element to be now inserted corresponds to the removed round filter element 28; it is inserted, with the end disk that is opposite the connecting end disk 36 leading, parallel to the symmetry axis 12 into the filter cup 16. For this purpose, the round filter element 28 is aligned in the circumferential direction relative to the filter head 16 such that the filter element guide path sections 70 are received between the rim guide path section 72 and thus supplement one another to the guide path 76.

The filter cup 16 with the round filter element 28 is inserted from below parallel to the symmetry axis 12 into the receiving area 22 of the filter head 14 and screwed in. When doing so, depending on the rotary position of the filter cup 16 relative to the filter head 14, the spring arms 74b of the securing spring elements 74 are first bent radially outwardly by the respectively slanted rim guide path sections 72 or the slanted filter element guide path sections 70. Upon rotation of the filter cup 16 relative to the filter head 14 in the closing direction, indicated in FIG. 2 by arrow 92, the spring arms 74b are guided under mechanical tension along the guide path 76.

Figure 4:
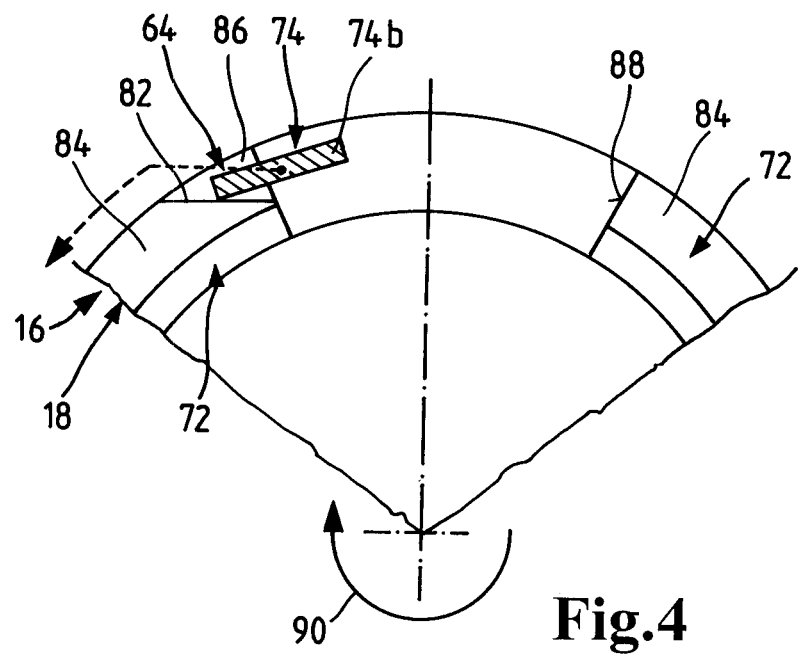
FIG. 4 shows schematically the filter system of FIG. 1 without filter element in the area of the securing device in cross-section during an opening movement.
Figure 5:
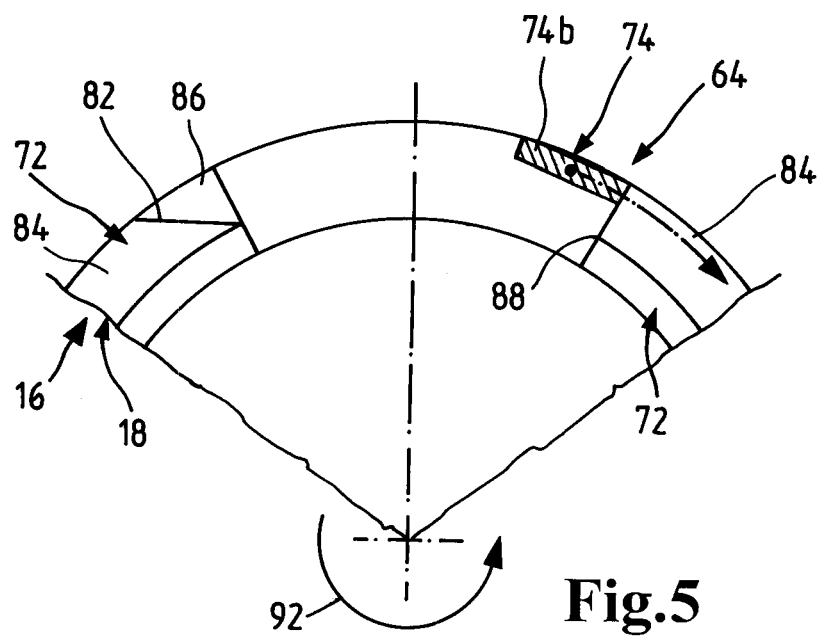
FIG. 5 shows schematically the filter system of FIG. 4 during a closing movement.

When the filter element guide path sections 70 are missing, as illustrated in FIG. 5, the securing spring elements 74 upon rotation of the filter cup 16 relative to the filter head 14 in the closing direction (arrow 92) hit against the respective blocking sections 88 of the rim guide path sections 72 and prevent closing of the filter cup 16. Upon rotation of the filter head 14 relative to the filter cup 16 in opening direction (arrow 90) the securing spring elements 74, as shown in FIG. 4, are guided along the guide sections 82 of the rim guide path sections 72 for opening the filter cup 16.

When using a wrong round filter element, the filter element guide path sections 70 do not match the rim guide path sections 72, for example, because their dimensions in circumferential direction are smaller than the corresponding free areas between the rim guide path sections 72, gaps remain between the filter element guide path sections 70 and the rim guide path sections 72. Into these gaps the securing spring elements 74 penetrate and, upon rotation of the filter cup 16 in the closing direction 92, they hit against the corresponding blocking sections 88 of the rim guide path sections 72 and prevent further rotation of the filter cup 16 in this way.

In case that the free areas between the filter element guide path sections 70 are too small for the rim guide path sections 72 or the free areas of the rim guide path sections 72 are too small for the filter element guide path sections 70 or the positions of the guide path sections 70 or 72 do not match the free areas of the respective other guide path sections 72 or 70, the filter element guide path sections 70 cannot be pushed between the rim guide path sections 72 when mounting the round filter element 28. The filter cup 16 cannot be inserted in axial direction far enough into the receiving area 22 of the filter head 14 in order to be screwed in. The same happens when the round filter element 28 is not mounted correctly in the filter cup 16 so that the connecting end disk 36 projects in axial direction. Wrong assembly is prevented in this way.

Figure 6:
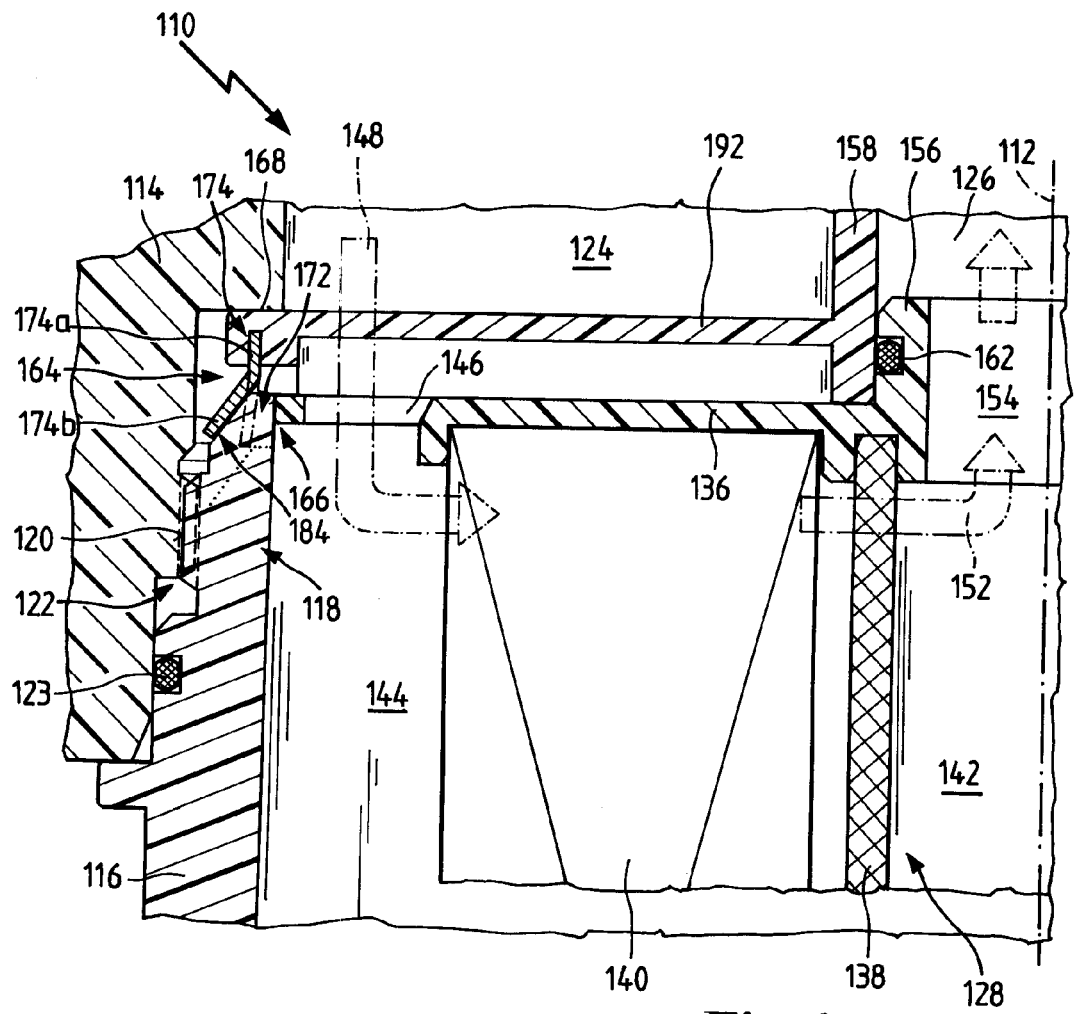
FIG. 6 shows schematically a detail view of a second embodiment of a filter system wherein securing spring elements of the securing device are arranged on a partitioning element between the filter head and the filter cup.

In a second embodiment, illustrated in FIG. 6, those elements that are similar to those described in the first embodiment illustrated in FIGS. 1 through 5 are identified with the same reference numerals with 100 being added so that with respect to their description reference is being had to the description of the first embodiment. This second embodiment differs from the first one in that the four securing spring elements 174 are attached to a partitioning or separating disk 192 instead of to the connecting end disk 136; the separating disk 192 is permeable for the raw fluid and is positioned between the filter head 114 and the filter cup 116. The partitioning disk 192 carries the receiving sleeve 158 of the filter head 114. Moreover, the securing spring elements 174 are not bent at a right angle but are straight so that the respective securing arm 174a is anchored in a space-saving way in axial direction in the rim area of the partitioning disk 192.

Figure 7:
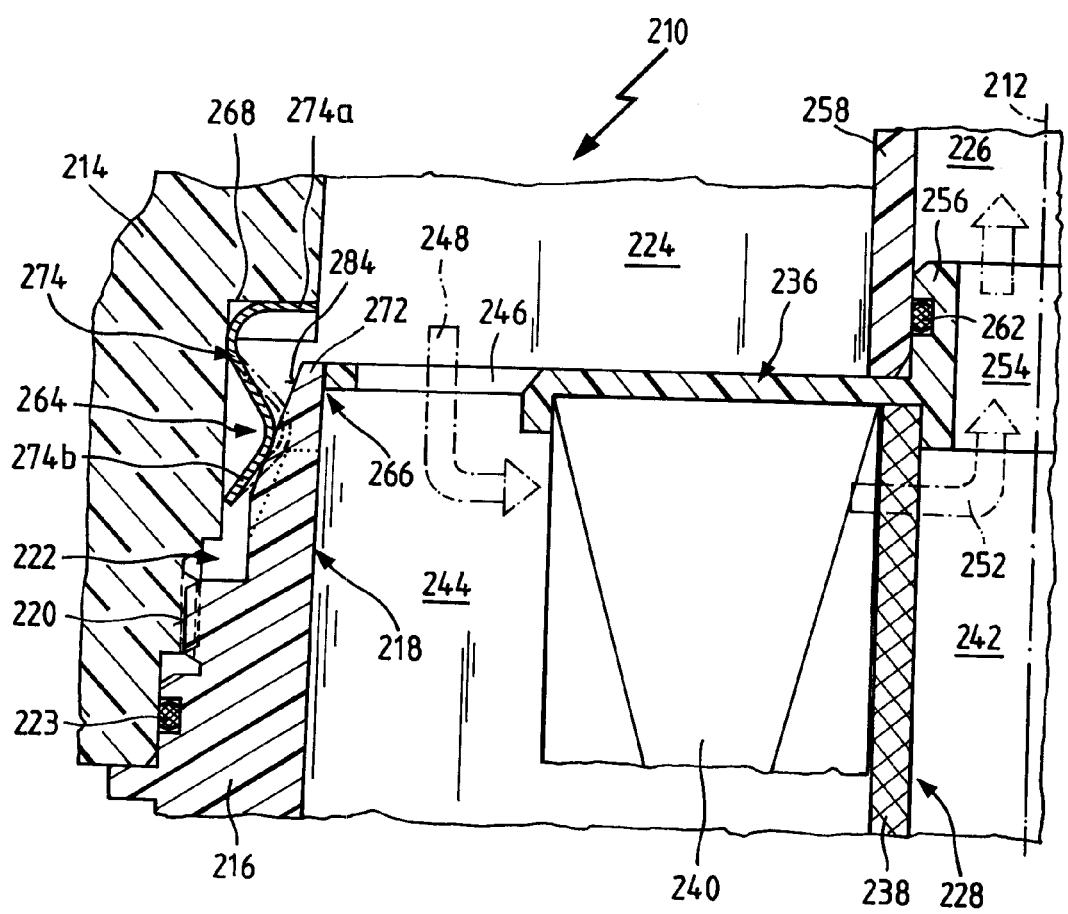
FIG. 7 shows schematically a detail view of a third embodiment of a filter system that is similar to the filter system of FIGS. 1 to 5 wherein the securing spring elements are bent several times.

In a third embodiment, illustrated in FIG. 7, those elements that are similar to those of the first embodiment as disclosed in FIGS. 1 through 5 are provided with the same reference numerals with 200 being added so that reference is being had to the description of the first embodiment supra. The third embodiment differs from the first one in that the spring arms 274b of the securing spring element 274 are bent multiple times. The free ends of the spring arms 274b point at a slant relative to the symmetry axis 12 radially outwardly. As a whole, the shape of the spring arms 274b with multiple bends improves guiding of the filter cup 216 with the round filter element 228 upon insertion into the receiving space 222 in axial direction and upon screwing in and facilitates assembly in this way. Moreover, the free ends of the securing arms 274a of the securing spring elements 274 point radially inwardly so that the spring arms 274b in radial direction are positioned farther outwardly.

Figure 8:
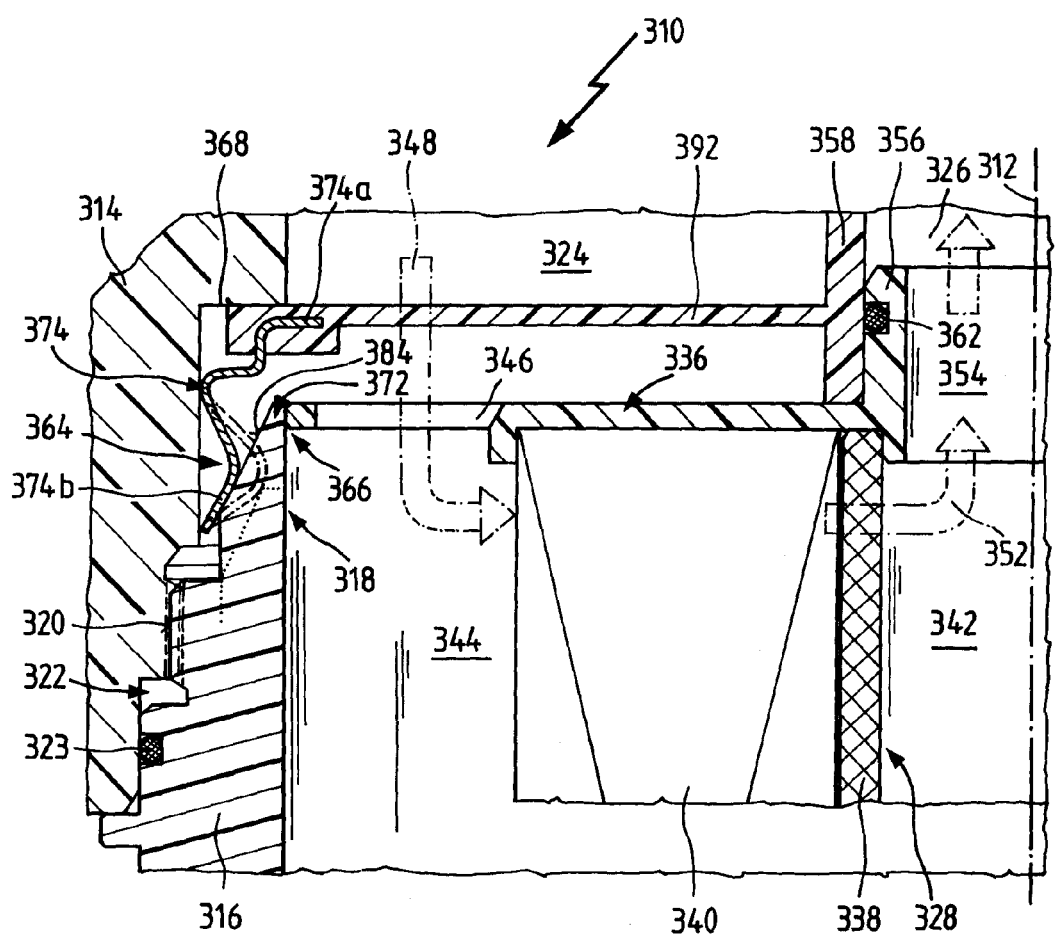
FIG. 8 shows schematically a detail view of a fourth embodiment of a filter system that is similar to the filter system of FIG. 6 wherein the securing spring elements are bent several times.

In a fourth embodiment illustrated in FIG. 8 those elements that are similar to those of the second embodiment illustrated in FIG. 6 and those of the third embodiment illustrated in FIG. 7 are identified with the same reference numerals with 200 or 100 being added so that reference is being had to the description and explanations regarding the second and third embodiments. The securing arms 374a of the securing spring element 374 are similar to those of the second embodiment described in FIG. 6 and are attached to the partitioning disk 392; however, the securing arms 374a point radially inwardly. The fourth embodiment differs from the second embodiment in that the spring arms 374 are not straight but are bent several times similar to the third embodiment of FIG. 7.

In all of the above described embodiments of the filter system 10, 110, 210, 310 and a round filter element 28, 128, 228, 328 the following modifications are possible inter alia.

The filter system 10, 110, 210, 310 instead of being used in motor vehicles can also be used in connection with industrial engines or compressors.

Instead of a screw connection the filter cup 16, 116, 216, 316 can also be connected by means of a different type of rotary and/or plug-in connection, for example, a bayonet connection, in a detachable way to the filter head 14, 114, 214, 314.

There are also configurations in which the filter head, instead of the cup-shaped receiving area 22, 122, 222, 322, is provided with a receiving socket onto which an appropriate filter cup can be attached by means of a rotary and/or plug-in movement. The connecting end disk and the securing device are then matched appropriately so that the receiving section of the filter head can be inserted into the filter cup.

Instead of being made from plastic, the connecting end disk 36, 136, 236, 336, the second end disk, and the support pipe 38, 138, 238, 338 can be made also from another, preferably hard but still elastic, material.

Instead of being attached in suspended arrangement from below, the filter cup 16, 116, 216, 316 can also be mounted from above onto the filter head 14, 114, 214, 314 that is then upside down.

Instead of the filter cup 16, 116, 216, 316, also a different housing with an inlet and an outlet can be provided and instead of the filter head 14, 114, 214, 314 also a cover that, in a different way, closes off the housing and provides access to the filter element may be provided.

Also, more or fewer than four filter element guide path sections 70, 170, 270, 370 and rim guide path sections 72, 172, 272, 372 and/or securing spring elements 74, 174, 274, 374 can be provided.

The rim guide path sections 72, 172, 272, 372 can be arranged instead of on the filter cup 16, 116, 216, 316 also on the filter head 14, 114, 214, 314. In this case, the securing spring elements 74, 174, 274, 374 can be attached to the filter cup 16, 116, 216, 316.

Instead of the elastic securing spring elements 74, 174, 274, 374, different securing elements can also be used that are pretensioned by respective restoring forces and that are flexible in radial direction.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter system for filtering fluids, the filter system comprising:
 a housing;
 a filter element arranged inside said housing;
 an inlet for a fluid to be filtered;
 an outlet for the filtered fluid;
 a cover closing said housing and, when removed from said housing, providing access to said filter element inside said housing;
 a securing device that prevents said housing from being closed by said cover when said filter element is missing;
 wherein said filter element has at least one filter element guide path section;
 wherein said housing or said cover has a rim area with at least one rim guide path section;
 wherein the filter element includes
  a first end disk secured at an axial end face of filter media of the filter element, the first end disk including:
   a radial outer rim;
   wherein the end disk at its radial outer rim forms at least one radially extending projection extending radially outwards from the radial outer rim;
   wherein the least one radially extending projection are spaced apart on the radial outer rim in a circumferential direction forming circumferential gaps therebetween;
   wherein the at least one radially extending projection forms the at least one filter element guide path section;
 wherein the housing includes:
  at least one axial projection formed on a rim area at an open axial end face of the housing, the at least one axial projection extending axially outwardly from the housing open end face;
  wherein the at least one axial projection are spaced apart on the open axial end face of the housing in a circumferential direction forming circumferential gaps therebetween;
 wherein the at least one axial projection forms the at least one rim guide path section;
 wherein the at least one filter element guide path section engages into corresponding ones of the gaps between the at least one rim guide path section;

wherein said securing device comprises at least one securing element arranged on said cover or on said housing or on a separating element disposed between the cover and the housing; and wherein at least one of the at least one rim guide path section and the at least one filter element guide path section have a radially inwardly slanted ramp surface forming the guide path along which the at least one securing element is guided when moving the cover relative to the housing in a closing direction.

2. The filter system according to claim 1, wherein said filter element is coaxial to said housing.

3. The filter system according to claim 1, wherein said first end disk of said filter element has an end face that is facing said rim area, said first end disk forming a connecting end disk, wherein said at least one filter element guide path section is disposed on said connecting end disk.

4. The filter system according to claim 1, wherein said housing is detachably connected to said cover by a rotary insertion movement.

5. The filter system according to claim 1, wherein said at least one securing element is an elastic spring element.

6. The filter system according to claim 1, wherein said at least one securing element is attached to said cover.

7. The filter system according to claim 1, further comprising
the separating element disposed between said cover and said housing,
wherein said at least one securing element is attached to said separating element.

8. The filter system according to claim 1, wherein said at least one rim guide path section is asymmetric in such a way that when said at least one filter element guide path section is missing, does not fit, or is mounted wrongly, said at least one securing element, when said cover is moved relative to said housing in a closing direction for closing said housing, hits a blocking section of said rim guide path section and said housing cannot be closed by said cover, wherein said at least one securing element, when moving said cover relative to said housing in an opening direction, is guided on a guide section of said rim guide path section for opening said housing.

9. The filter system according to claim 1, wherein said housing and said filter element are cylindrical.

10. The filter system according to claim 1, wherein said filter element is a round filter element.

11. A filter element of a filter system for filtering fluids, the filter system comprising a housing in which the filter element is arranged, an inlet for a fluid to be filtered, an outlet for the filtered fluid, a cover that closes the housing and provides access to the filter element when arranged inside the housing, and a securing device that prevents closing of the housing by the cover when the filter element is missing, the filter element comprising:

a first end disk secured at an axial end face of the filter media, the first end disk including:
a radial outer rim;
wherein the end disk at its radial outer rim forms at least one radially extending projection, the at least one radially extending projection extending radially outwards from the radial outer rim;
wherein the at least one radially extending projection are spaced apart on the radial outer rim in a circumferential direction forming circumferential gaps therebetween;
wherein the at least one radially extending projection forms the at least one filter element guide path section;
wherein the at least one filter element guide path section interacting with at least one rim guide path section provided in a rim area of the housing or the cover,
wherein the at least one filter element guide path section engages into corresponding gaps between at least one rim guide path section of the housing,
wherein at least one of the at least one rim guide path section and the at least one filter element guide path section have a radially inwardly slanted ramp surface forming a guide path,
wherein a securing element of the securing device is guided on said guide path when a closing movement is carried out closing the housing by the cover.

12. The filter element according to claim 11, configured to be coaxial to the housing.

13. The filter system according to claim 8, wherein
the at least one securing element is a spring element, the spring element having
a fixed end secured to said cover or said housing or to said separating element disposed between the cover and the housing;
a free end extending axially outwardly;
wherein the free end engages against an opposing one of said cover or said housing, preventing said housing from closing in said closing direction, unless the free end is displaced radially by said guide path.

* * * * *